C. CHETING.
SHRIMP NET.
APPLICATION FILED AUG. 13, 1913.
1,103,173.
Patented July 14, 1914.
2 SHEETS—SHEET 1.
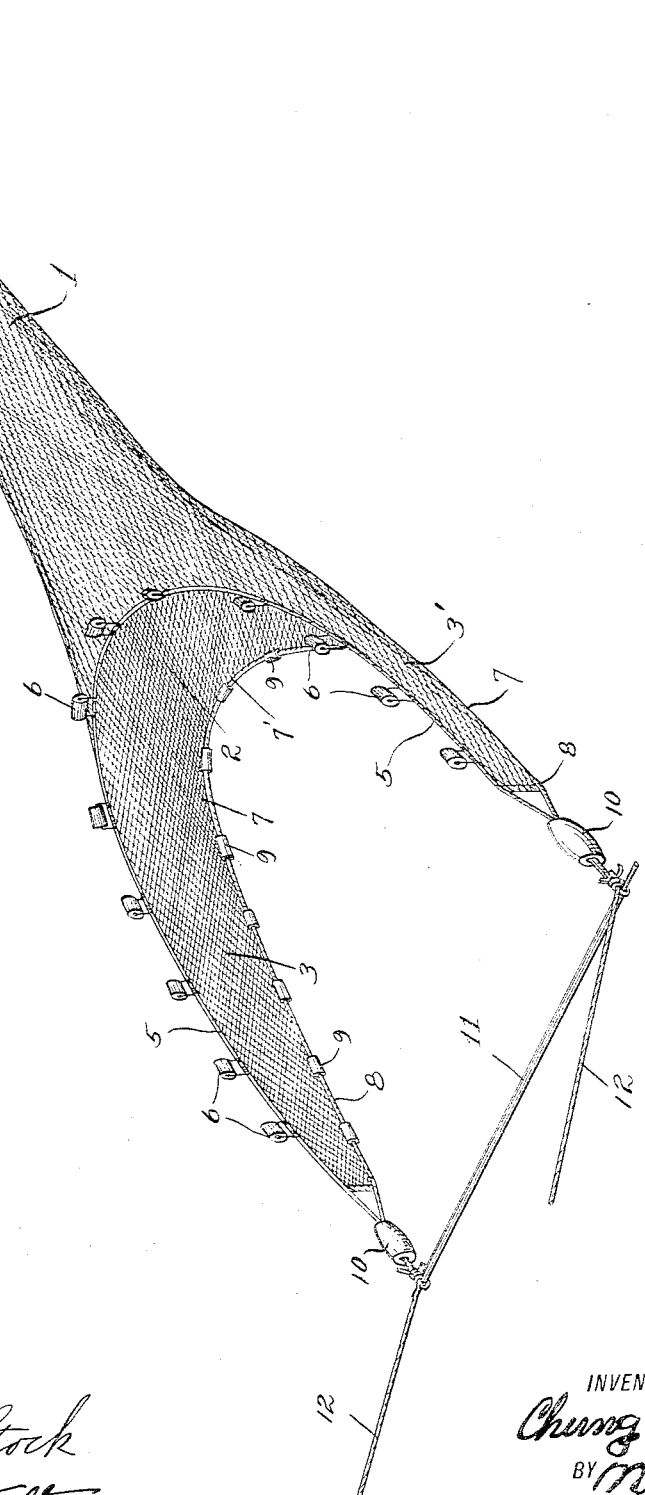

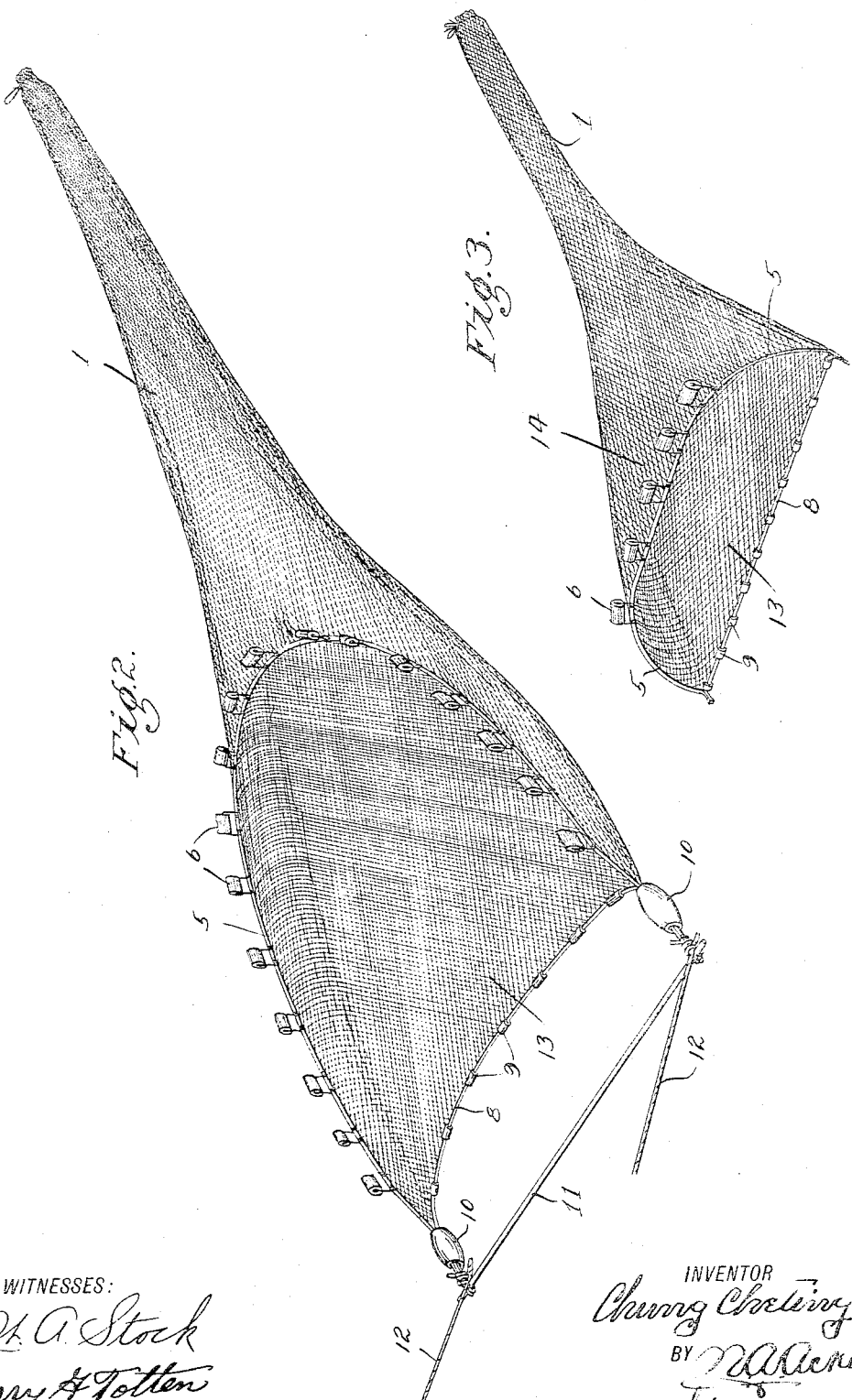

UNITED STATES PATENT OFFICE.

CHUNG CHETING, OF SAN FRANCISCO, CALIFORNIA.

SHRIMP-NET.

1,103,173. Specification of Letters Patent. Patented July 14, 1914.

Application filed August 13, 1913. Serial No. 784,575.

*To all whom it may concern:*

Be it known that I, CHUNG CHETING, a subject of the Emperor of China, residing in the city and county of San Francisco and State of California, have invented certain new and useful Improvements in Shrimp-Nets, of which the following is a specification.

The hereinafter described invention relates to an improved net of such construction as to permit of being drawn over the bed wherein the shrimps are located, and this without destruction to the fish within such water; the object being the production of a net shallow in height but exceedingly large at the mouth thereof, so as to have considerable area for the gathering and guiding of the shrimps through the throat into the rearwardly extended tapering body portion, the said mouth portion of the net being weighted to lie on the bed of the water to be worked, in order that the net as drawn thereover shall agitate the soil and disturb the small crustaceans from their bed and gradually direct and guide them into the body portion of the net, which is upheld at its throat or entrance portion and likewise mouth portion to a proper height by means of a plurality of small floats attached thereto at intervals.

The usual manner of catching shrimps is by the employment of what are known as fixed nets of the bag type, which nets are secured against movement within the water by means of stakes, the shrimps being forced into the net by the flow of the tides, permitting a catch to be made with each tide. However, due to the sag of the net toward its rearward end, such fish as may swim therein moving well into the body thereof become entangled with the shrimp and the mesh of the net, and being unable to escape therefrom are killed. To such an extent is the destruction to the fish by the employment of the stationary bag net for the catching of shrimp, that laws have been passed, at least in the State of California, prohibiting the use of such form of nets for shrimp fishing, due to the destruction of the fish caught therein.

The present net permits of trolling for the shrimp and thus enables the catching thereof during all hours of the day, instead of only at such times as the tide flow changes, and inasmuch as the strain placed onto the net during the movement thereof over the bed for the disturbance of the shrimps maintains the net substantially extended throughout its length, such fish as are carried there-
in may easily swim therefrom, and thus not be destroyed as heretofore. However, as the net is a shallow one, rising only about two feet above the bed to be worked, and as the movement of the net through the water scares or frightens the fish, the danger of the same moving or being carried into the net is reduced to a minimum; whereas, where the net is a fixed one, the fish are not frightened and swimming into the open mouth toward the rear end thereof become entangled with the mass of shrimp and are killed.

To comprehend the invention, reference should be had to the accompanying sheet of drawings, wherein—

Figure 1 is a perspective view of the net illustrating the floor and roof wall of the mouth removed, disclosing the weights for holding the lower edge thereof to the bed to be worked over, the floats for holding up the upper edge thereof, the spreader for maintaining separated or spaced the outer end portions of the mouth of the net, and the cords or cables upwardly extended therefrom for attachment to a propelling structure. Fig. 2 is a similar view illustrating the mouth of the net provided with a floor section. Fig. 3 is a similar view disclosing the roof of the mouth extended forwardly coextensive with the floor section illustrated in Fig. 2 of the drawings.

In the drawings, the numeral 1 is used to designate the tapering tubular body portion of the net which is closed at its rear end and formed of woven twine, linen thread or other suitable material, the mesh of which is of such fineness as to restrain the passage of the shrimp therethrough, the body throughout being closed at its sides, bottom and top, and from the throat portion 2 thereof springing the mouth walls 3 and 3', which are extended for quite a distance beyond the throat portion 2. The upper edge of the mouth walls 3 and 3', which are extended upwardly for approximately two feet, more or less, is reinforced by a heavy cord or rope 5, and to the same at intervals throughout the length thereof are united the floats or corks 6, for buoying and holding up said walls and the upper edge of the throat portion of the net. In a similar manner the lower edge 7 of the mouth walls 3 and 3' and the lower edge 7' of the throat portion 2 are reinforced by a heavy cord or rope 8, to which at intervals throughout the length thereof are secured the small weights 9, for holding the said edge portions of the net to the mud bottom of the water.

To the ends of the reinforcing cords 5 and 8 for the upper and lower edges of the walls 3 and 3' the heavy drag weights 10 are attached in any suitable manner for securely holding the outer end corners of the net to the bottom of the water-way as pulled thereover, and these ends are held apart by means of the transversely disposed spreader rod 11, from which upwardly extends the ropes 12 for drawing the net over the surface of the bottom within which rest and move the shrimp to be collected. These ropes 12 are attached at their upper end to a boat or other moving structure, which serves as the propelling means for dragging or trolling the net over the field of operation.

During the movement of the net through the water adjacent the bed thereof, the spreader rod 11 dragging over the mud bottom, being held thereto by its own weight and that of the weights 10, agitates the same and stirs up the shrimps, which as they move upwardly within the area of the mouth walls 3 and 3' are directed and gradually guided thereby into the extended throat portion 2 of the net, moving therethrough into the rearwardly extended tapering body portion 1, within which they are held confined against escape.

The mouth walls of the form of net disclosed in Fig. 1 of the drawings is such when held apart by the spreader rod 11, as to produce substantially a U-shaped mouth section for the net, the area of which is greatest at its outer portion. Inasmuch as the shrimps move but a slight distance above the surface of the bottom when disturbed, it is not required that the mouth walls extend upwardly for more than two feet, and as the lower edge of the said walls and that of the throat portion of the net are held down by the weights 9, the disturbed shrimps are confined within the area of the mouth walls and during the forward movement of the net are gradually guided into the body of the net through the open throat portion 2.

If so desired the mouth portion of the net may be provided with a floor section 13—Fig. 2 of the drawings, and equally so a roof section 14 may be provided—Fig. 3 of the drawings, just so long as the extended mouth area is preserved. However, preference is given to the mouth construction disclosed by Fig. 1 of the drawings, due to the fact that ample area of freedom is given for the shrimp after being disturbed from within its bed in which to swim or move without injury while at the same time being confined within the boundary walls of the mouth section and gradually guided into the open throat portion of the net, which is maintained in an open or distended position by the floats 6.

The tendency of the floor section 13 is to mash or injure some of the shrimps by a too sudden entanglement with the mesh thereof, after being disturbed from their bed, which is the main thing to be provided against. This objection holds to the construction disclosed by Fig. 3 of the drawings, although the form of net therein illustrated and equally so that illustrated by Fig. 2 of the drawings will answer for the gathering of shrimps, although neither of said forms is as efficient a net as that disclosed in Fig. 1 of the drawings, not only due to the tendency to injure the shrimp, but also by reason of the fact that freedom for the shrimps should be provided for after the agitation thereof in order to maintain the same free from and a slight distance above their bed to permit of their being guided into the open throat clear of the lower reinforced edge thereof.

The rod 11, which may be constructed of bamboo or metal, not only serves to maintain the mouth section open and extended its full distance, but equally so as a means of agitating the shrimps and raising the same free of their bed, the latter feature being one of the essentials for an economic shrimp net, while the function of the mouth walls is to confine the disturbed shrimp within a given area and to gradually guide the same into the open throat.

In the practical working for the collecting of shrimps in the improved net, three of said nets are lowered from a launch or other movable structure, one from the rear and one from each side thereof until the same rest on the soft mud bottom of the fishing ground, each net being held to the boat by the ropes 12 extended therefrom. As movement is imparted to the launch, boat or propelling structure which is slowly moved over the fishing bed, the nets are dragged over the surface of the bottom, the spreader rod 11 gradually turning over the soft soil and releasing the shrimp. The agitated crustaceans are prevented from escaping from within the area of the mouth portion of the net by the walls 3 and 3' thereof, the lower edges of which being held down by the weight 9 and maintained in substantially a vertical position by the floats 6. As the height of these walls do not exceed approximately two feet, there is no liability of fish being caught within the net, there being ample opportunity for the frightened fish, should they be swimming so low in the water, to escape above the level of the open mouth section.

By means of the improved net the fishing for shrimps may be continued throughout all hours of the day in season, and the fishing ground repeatedly traversed by the propelled nets, resulting in a larger catch for the day and the more economic and efficient gathering of the shrimp.

I do not wish to be understood as confining or limiting myself to the form and construction of the net as illustrated and described, being well aware that the same may be modified and changed without departing from the spirit of the invention, the essence of which resides in a wide open mouth section connected to an inclosing body portion for the shrimp, with means for holding open the mouth section and maintaining its upper edge a distance above the lower edge thereof to provide an open runway into the body portion of the net, with means extended upwardly for connecting the net to a movable structure.

Having thus described the invention what is claimed as new and desired to be protected by Letters Patent is:—

1. A trolling net for shrimp comprising an inclosing tapering relatively shallow body portion of meshed material, the mesh being of a size to prevent the passage therethrough of shrimp or the like, a wide mouth portion extended therefrom, a plurality of floats for supporting the upper edge of the mouth section, and means for maintaining the lower edge thereof adjacent to the ground to be worked, a spreader rod in advance of the mouth of the net for holding the mouth section extended, said spreader rod being normally in contact with the ground whereby to agitate the same and stir up the shrimp, which are thereby guided into the mouth of the net, and means projected from said rod for uniting the net to a floating structure.

2. A trolling net of meshed material, the same comprising an inclosing body portion, a wide open mouth section extended therefrom, the body portion being formed of a material to prevent the passage therethrough of shrimp, a reinforcing cord secured to the upper and lower edges of the mouth section, a plurality of floats united to the upper reinforcing cord and a plurality of weights united to the lower reinforcing cord, relatively large holding weights for the outer ends of the mouth section, a spreader projecting between said outer ends of the mouth section in advance of said relatively large weights for maintaining separated the walls of the mouth section and agitating the surface, and means projected from the spreader for uniting the net to a floating structure.

3. A trolling net of meshed material, the same comprising an inclosing tapering body portion, a wide substantially U-shaped mouth section extended therefrom, free of floor and roof walls, means for holding the upper edge thereof separated from the lower edge when in the water, devices for holding the lower edge of the mouth section to the ground surface, a spreader forwardly of the mouth for holding separated the ends of the mouth section, holding weights secured to said ends adapted with the weight of the spreader to hold the latter in contact with the ground to agitate the latter at a point in advance of the net, and means projected from the spreader for uniting the net to a propelling structure.

4. A trolling net of meshed material, the same comprising an inclosing tapering body provided with a shrimp inlet throat portion, the body being constructed of a mesh to prevent the passage of shrimp therethrough, a wide mouth section extended therefrom, a plurality of floats for holding the upper edge thereof a distance above the ground line when the net is in the water, a plurality of weights secured to the lower edge of the mouth section to hold the same to the bed of the water, a spreader rod arranged in advance of the mouth section and maintaining separated the outer ends of the mouth section, holding weights interposed between the spreader rod and the ends of said section for holding the spreader and outer ends of the mouth in contact with the ground, and means for uniting the net to a propelling structure.

5. In a trolling net for shrimp and the like, the combination of a tapering relatively shallow body of meshed material having an enlarged open forward mouth, a reinforcing cord secured to the upper edge of the mouth, a reinforcing cord secured to the lower edge of said mouth, a series of floats secured to the upper cord, a series of weights secured to the lower edge cord and sufficiently heavy to maintain the lower edge of said mouth adjacent the ground, the ends of the upper and lower cords terminating at the sides of the mouth and projecting forwardly relative to the mouth, a spreader rod projecting from side to side of the net arranged in advance of the mouth portion thereof and secured to said cord projections, means whereby said spreader rod engages the ground and forms an agitating means forwardly of the net, and propelling means secured to said rod.

6. In a trolling net for shrimp and the like, the combination of a tapering body of meshed material having an enlarged open forward mouth, a reinforcing cord secured to the upper edge of the mouth, a reinforcing cord secured to the lower edge of said mouth, a series of floats secured to the upper cord, a series of weights secured to the lower edge cord and sufficiently heavy to maintain the lower edge of said mouth adjacent the ground, the ends of the upper and lower cords terminating at the sides of the mouth and projecting forwardly relative to the mouth, a spreader rod projecting from side to side of the net in advance of the mouth portion thereof and secured to said cord projections, whereby said rod is positioned forwardly of the mouth of the net, relatively heavy weights secured to said cord projections between the spreader rod and mouth ends of the net, and propelling cords secured to said rod.

In testimony whereof I have signed my name to this specification in the presence of two subscribing witnesses.

CHUNG CHETING.

Witnesses:
 PHEYTON WALSH,
 N. A. ACKER.

Copies of this patent may be obtained for five cents each, by addressing the "Commissioner of Patents, Washington, D. C."